(12) United States Patent
Abriles et al.

(10) Patent No.: US 8,999,231 B2
(45) Date of Patent: Apr. 7, 2015

(54) NICKEL ALLOY FOR REPAIRS

(75) Inventors: Beth Kwiatkowski Abriles, Madison, CT (US); Norman Pietruska, Durham, CT (US); John H. Hyde, South Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 1112 days.

(21) Appl. No.: 11/440,683

(22) Filed: May 24, 2006

(65) Prior Publication Data

US 2007/0272332 A1 Nov. 29, 2007

(51) Int. Cl.

| | |
|---|---|
| C22C 19/03 | (2006.01) |
| C22C 19/05 | (2006.01) |
| B22F 1/00 | (2006.01) |
| B22F 1/02 | (2006.01) |
| C22C 1/05 | (2006.01) |
| B23K 35/28 | (2006.01) |
| C22F 1/10 | (2006.01) |
| B32B 15/01 | (2006.01) |
| B22F 7/06 | (2006.01) |
| B23K 35/02 | (2006.01) |
| B23K 35/30 | (2006.01) |
| C22C 1/04 | (2006.01) |
| F01D 5/00 | (2006.01) |

(52) U.S. Cl.
CPC ............ *C22C 19/057* (2013.01); *B22F 1/0003* (2013.01); *B22F 7/064* (2013.01); *B23K 35/025* (2013.01); *B23K 35/3033* (2013.01); *C22C 1/0433* (2013.01); *C22C 19/05* (2013.01); *C22C 19/058* (2013.01); *F01D 5/005* (2013.01); *F05D 2230/80* (2013.01); *F05D 2230/237* (2013.01)

(58) Field of Classification Search
None
See application file for complete search history.

(56) References Cited

U.S. PATENT DOCUMENTS

| | | | |
|---|---|---|---|
| 5,240,491 A | 8/1993 | Budinger et al. | |
| 5,523,170 A | 6/1996 | Budinger et al. | |
| 6,027,584 A | 2/2000 | Jackson et al. | |
| 6,454,885 B1 * | 9/2002 | Chesnes et al. | 148/528 |
| 2007/0102483 A1 * | 5/2007 | Pietruska et al. | 228/101 |

FOREIGN PATENT DOCUMENTS

| | | | |
|---|---|---|---|
| EP | 1258312 | | 11/2002 |
| EP | 1783237 | | 5/2007 |
| GB | 2153845 | | 8/1985 |
| WO | WO 02/50323 | | 6/2002 |
| WO | WO 03/025237 | | 3/2003 |
| WO | WO 2004/044953 | * | 1/2004 |
| WO | WO 2005/054528 | | 6/2005 |

OTHER PUBLICATIONS

Su et al, Effect of Mechanical Properties Using Different Filler Metals on Wide-Clearance Activated-Diffusion Brazed Ni-Based Superalloy, JMEPEG 9:663-68, 664 (2000).*
Nicrobraz MSDS (Wall Colmonoy Corporation, Nicrobraz S-Binder MSDS (2008).*
Schwartz, Brazing 2nd ed. ASM Int'l (2003).*

* cited by examiner

*Primary Examiner* — Yoshitoshi Takeuchi
(74) *Attorney, Agent, or Firm* — Bachman & LaPointe, P.C.

(57) ABSTRACT

A nickel base repair alloy comprises a blend of about 40 to 60 wt % of a first nickel based braze alloy containing boron, about 15 to 35 wt % of a first nickel based filler material, and the remainder consisting of a blend of a second nickel based filler material and a low melting eutectic braze nickel based alloy.

6 Claims, No Drawings

NICKEL ALLOY FOR REPAIRS

BACKGROUND

(1) Field of the Invention

The present invention relates to a nickel base repair alloy which may be used to repair workpieces, such as turbine engine components, and to methods for repairing such workpieces.

(2) Prior Art

Current materials used for repairing workpieces or components formed from a nickel based alloy used in turbine engines typically permit a maximum 0.010 inch wide crack to be repaired. Thus, there is a need for a repair material which can be used to repair wide gap cracks greater than about 0.010 inch wide.

SUMMARY OF THE INVENTION

In accordance with the present invention, there is provided a nickel base repair alloy comprising a blend of about 40 to 60 wt % of a first nickel based braze alloy containing boron, about 15 to 35 wt % of a first nickel based filler material, and the remainder consisting of a blend of a second nickel based filler material and a low melting eutectic braze nickel based alloy.

Further in accordance with the present invention, there is provided a method for repairing cracks in a workpiece comprising: applying a nickel base repair alloy to a cracked area on said workpiece, said nickel base repair alloy comprising a blend of about 40 to 60 wt % of a first nickel based braze alloy containing boron, about 15 to 35 wt % of a first nickel based filler material, and the remainder consisting of a blend of a second nickel based filler material and a low melting eutectic braze nickel based alloy.

Still further in accordance with the present invention, there is provided a material for repairing a crack in a nickel based alloy component, said material consisting essentially of about 7.0 to 10.0 wt % chromium, about 4.0 to 7.0 wt % tungsten, about 3.0 to 6.0 wt % aluminum, about 1.0 to 5.0 wt % tantalum, about 0.5 to 3.0 wt % boron, about 9.0 to 11.0 wt % cobalt, about 0.5 to 2.0 wt % molybdenum, up to about 2.5 wt % rhenium, about 0.5 to 2.5 wt % hafnium, up to 0.03 yttrium, and the balance nickel.

Other details of the nickel alloy for repairs of the present invention, as well as other objects and advantages attendant thereto, are set forth in the following detailed description.

DETAILED DESCRIPTION OF THE PREFERRED EMBODIMENT(S)

As noted above, the present invention relates to a blend of powders which are used to form a nickel based alloy which can be used to repair turbine engine components having cracks with wide gaps in the range of about 0.010 to 0.040 inches wide. The present invention also relates to processes for repairing components having such cracks and to the repair material itself.

The repair material is a nickel based alloy preferably formed from four metallic powders mixed in a binder. The powders are mixed together and suspended in a typical industry flux free organic based brazing binder that is capable of burning off without leaving an undesirable residue when paste is heated to not higher than 1000° F. A suitable binder is NicroBraz S binder or Vitta Braz Binder Gel. The amount of binder used will vary from manufacturer to manufacturer. For a paste form, 8 to 15 wt % should be the binder. The four metallic powders may comprise a first nickel based braze alloy containing boron, a first nickel based filler material, a second nickel based filler material, and a low melting eutectic braze nickel based alloy. A suitable blend may contain about 40 to 60 wt % of a first nickel based braze alloy containing boron, about 15 to 35 wt % of a first nickel based filler material, and the remainder consisting of a blend of a second nickel based filler material and a low melting eutectic braze nickel based alloy.

In a preferred embodiment of the present invention, the first nickel based braze alloy may contain about 6.0 to 6.8 wt % chromium, about 1.175 to 1.225 wt % boron, about 0.080 to 0.12 wt % carbon, about 5.7 to 6.1 wt % aluminum, about 0.04 to 0.12 wt % zirconium, about 12.1 to 13.0 wt % cobalt, about 1.5 to 1.9 wt % molybdenum, about 6.0 to 6.8 wt % tungsten, about 2.75 to 3.25 wt % rhenium, about 3.75 to 4.24 wt % tantalum, about 1.0 to 2.0 wt % hafnium, and the balance nickel.

Further in a preferred embodiment, the first nickel based filler material may contain about 0.13 to 0.17 wt % carbon, about 8.0 to 8.8 wt % chromium, about 9.0 to 11.0 wt % cobalt, about 0.5 to 0.8 wt % molybdenum, about 2.8 to 3.3 wt % tantalum, about 0.9 to 1.2 wt % titanium, about 9.5 to 10.5 wt % tungsten, about 5.3 to 5.7 wt % aluminum, about 0.010 to 0.020 wt % boron, about 1.2 to 1.6 wt % hafnium, about 0.03 to 0.08 wt % zirconium, and the balance nickel.

Further in a preferred embodiment, the second nickel base filler material may contain 14 wt % chromium, 10 wt % cobalt, 3.5 wt % aluminum, 2.75 wt % boron, 2.5 wt % tantalum, 0.1 wt % yttrium, and the balance nickel. A suitable material is a product commercially known as DF-4B.

Still further in a preferred embodiment, the low melting eutectic braze nickel based alloy may contain about 13.5 to 16.0 wt % chromium, about 3.25 to 4.0 wt % boron, and the balance nickel. A suitable material is a product commercially known as NICROBRAZ 150.

The four powders may be blended with the binder using any suitable technique known in the art. While it is preferred that the blended nickel base repair alloy be in powder form, if desired, the blend may take the form of a paste or a paint. Alternatively, any suitable technique known in the art may be used to convert a powder form of the blend into a plate form.

The repair material has a composition consisting essentially of about 7.0 to 10.0 wt % chromium, about 4.0 to 7.0 wt % tungsten, about 3.0 to 6.0 wt % aluminum, about 1.0 to 5.0 wt % tantalum, about 0.5 to 3.0 wt % boron, about 9.0 to 11.0 wt % cobalt, about 0.5 to 2.0 wt % molybdenum, up to about 2.5 wt % rhenium, about 0.5 to 2.5 wt % hafnium, up to 1.0 wt % titanium, up to 0.03 wt % yttrium, and the balance nickel. In a preferred embodiment, the repair material has a chromium content in the range of about 8.5 to 9.5 wt %, a tungsten content in the range of about 5.0 to 6.2 wt %, an aluminum content in the range of about 4.0 to 5.0 wt %, a titanium content in the range of about 0.15 to 0.4 wt %, a tantalum content in the range of about 3.0 to 4.0 wt %, a boron content in the range of about 1.0 to 1.5 wt %, a cobalt content in the range of about 10 wt % to 11 wt %, a molybdenum content in the range of about 0.9 to 1.3 wt %, a rhenium content in the range of about 1.0 to 2.0 wt %, a hafnium content in the range of 1.0 to 1.3 wt %, and a yttrium content in the range of 0.01 to 0.02 wt %. The rhenium improves high temperature creep, while yttrium is a grain boundary strengthener.

In order to effect a repair, the repair area on the component to be repaired may first be cleaned to remove any loose debris and/or contaminants in the repair area. Any suitable technique known in the art may be used to clean the repair area. Thereafter, the nickel base repair alloy may be applied to the repair area so that the repair alloy fills any crack in the area. Following the application step, the component and the repair alloy are preferably subjected to a melt cycle for a time period of about 15 to 30 minutes at a temperature greater than the melt temperature of the blended nickel base repair alloy. Following the melt cycle, the component with the melted repair alloy may be subjected to a diffusion cycle at a temperature of about 2200 to 2300° F., preferably about 2200 to 2250° F., for a time period of about 5.0 to 25 hours, preferably about 10 to 20 hours. After the diffusion cycle has been completed, the component with the repair material may be allowed to cool to room temperature. If necessary, the component with the repair material may be subjected to further processing to remove any bumps or other distortions.

After the diffusion process, the microstructure of the repair alloy is generally isothermal with small amounts of athermal. Extending the diffusion time may reduce the amount of athermal phases.

If desired, the repair alloy of the present invention may be used in conjunction with other nickel based repair alloys.

The repair alloy of the present invention may be used to repair cracks about 0.010 to 0.040 inches wide. The repair alloy of the present invention enables these wide cracks or gaps to achieve complete or almost complete isothermal solidification during the repair process, which is not possible with some current repair alloy mixtures. The repair material may be used to repair a wide variety of turbine engine components, especially those formed from equiaxed and directionally solidified nickel based alloys.

It is apparent that there has been provided in accordance with the present invention a nickel alloy for repairs which fully satisfies the objects, means, and advantages set forth hereinbefore. While the present invention has been described in the context of specific embodiments thereof, other unforeseeable alternatives, modifications, and variations may become apparent to those skilled in the art having read the foregoing description. Accordingly, it is intended to embrace those alternatives, modifications, and variations as fall within the broad scope of the appended claims.

What is claimed is:

1. A nickel base repair alloy consisting of a blend of about 40 to 60 wt % of a first nickel based braze alloy containing boron, 15 to 35 wt % of a first nickel based filler material, and the remainder consisting of a blend of a second nickel based filler material and a low melting eutectic braze nickel based alloy, said blend being mixed in a binder, said first nickel based alloy consisting of about 6.0 to 6.8 wt % chromium, about 1.175 to 1.225 wt % boron, about 0.080 to 0.12 wt % carbon, about 5.7 to 6.1 wt % aluminum, about 0.04 to 0.12 wt % zirconium, about 12.1 to 13.0 wt % cobalt, about 1.5 to 1.9 wt % molybdenum, about 6.0 to 6.8 wt % tungsten, about 2.75 to 3.25 wt % rhenium, about 3.75 to 4.24 wt % tantalum, about 1.0 to 2.0 wt % hafnium and the balance nickel, and said low melting eutectic braze nickel based alloy consisting of about 13.5 to 16.0 wt % chromium, from about 3.25 to 4.0 wt % boron, and the balance nickel, and said nickel based repair alloy being in a form to be applied to a workpiece, wherein said first nickel based filler material consists of about 0.13 to 0.17 wt % carbon, about 8.0 to 8.8 wt % chromium, about 9.0 to 11.0 wt % cobalt, about 0.5 to 0.8 wt % molybdenum, about 2.8 to 3.3 wt % tantalum, about 0.9 to 1.2 wt % titanium, about 9.5 to 10.5 wt % tungsten, about 5.3 to 5.7 wt % aluminum, about 0.010 to 0.020 wt % boron, about 1.2 to 1.6 wt % hafnium, about 0.03 to 0.08 wt % zirconium, and the balance nickel.

2. The nickel base repair alloy of claim 1, wherein each of said first nickel based braze alloy, said first nickel based filler material, said second nickel based filler material, and said low melting eutectic braze nickel based alloy are in powder form.

3. The nickel base repair alloy of claim 1, wherein said second nickel base filler material consists of 14 wt % chromium, 10 wt % cobalt, 3.5 wt % aluminum, 2.75 wt % boron, 2.5 wt % tantalum, 0.1 wt % yttrium, and the balance nickel.

4. The nickel base repair alloy of claim 1, wherein said binder is a flux free organic based brazing binder.

5. The nickel base repair alloy of claim 1, wherein said binder burns off without leaving an undesirable residue when said nickel base repair alloy is heated to a temperature not higher than 1000 degrees Fahrenheit.

6. The nickel base repair alloy of claim 1, wherein said nickel base repair alloy is in paste form when applied to an article to be repaired.

* * * * *